March 31, 1936. H. A. RANLETT 2,036,099
VEHICLE BRAKE CONTROL
Filed May 19, 1934 2 Sheets-Sheet 1
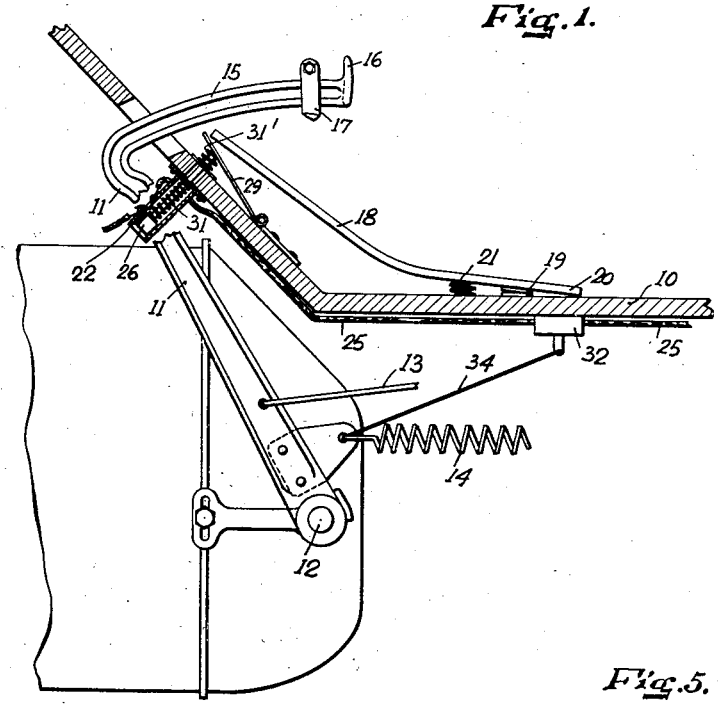
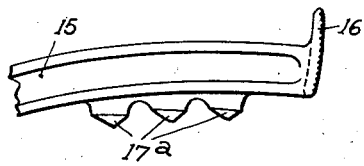
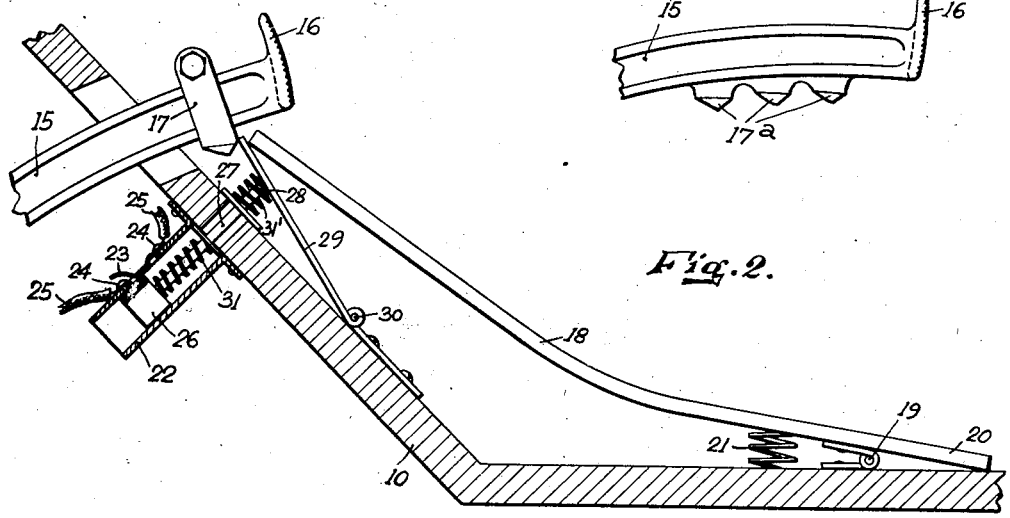
INVENTOR.
HELEN A. RANLETT,
BY Carew Weeks
ATTORNEY.

March 31, 1936.    H. A. RANLETT    2,036,099
VEHICLE BRAKE CONTROL
Filed May 19, 1934    2 Sheets-Sheet 2
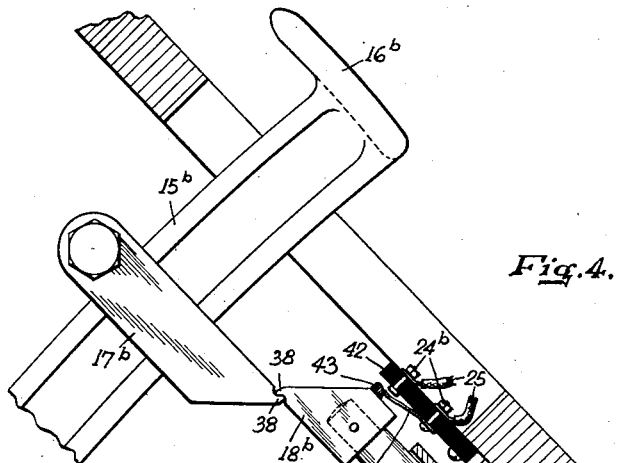
Fig.4.
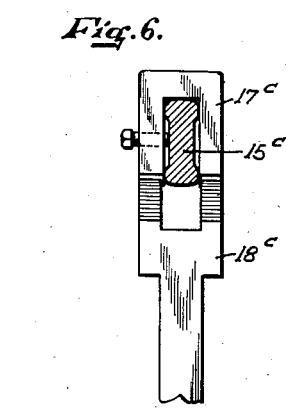
Fig.6.
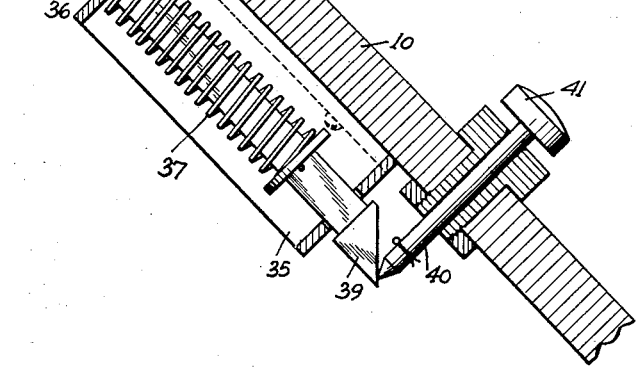
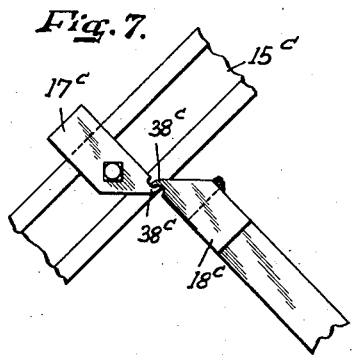
Fig.7.
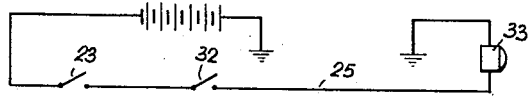
Fig.3.
INVENTOR.
HELEN A. RANLETT,
BY Carl W. Weeks
ATTORNEY.

Patented Mar. 31, 1936

2,036,099

UNITED STATES PATENT OFFICE 2,036,099

VEHICLE BRAKE CONTROL

Helen A. Ranlett, New York, N. Y.

Application May 19, 1934, Serial No. 726,434

9 Claims. (Cl. 177—339)

This invention relates to improvements in vehicle braking systems and more particularly to such systems applicable to automobiles and like vehicles.

It is a general object of the invention to provide a braking system of the class mentioned wherein the brake, after being set or applied by the operator, is maintained in set position by an improved mechanism which not only is locked in position by a simple operation, but is quickly and easily releasable.

A further object is to provide, in a vehicle braking system of the class mentioned, an improved mechanism for locking the brake in set condition and for subsequently releasing, and at the same time providing a signal, ordinarily in the form of a tail light, which is automatically displayed when the brake is set and automatically extinguished when the braking mechanism is held by the locking mechanism in brake-setting position.

Still another object of the invention is to provide, in a brake controlling system of the class mentioned, a brake locking mechanism having an improved holding and releasing device so positioned and arranged that it may be most conveniently operated by a minimum of effort on the part of the operator and being conveniently accessible for operation by the foot which controls the brake pedal.

A further object of the invention is to provide, in a brake controlling system of the class mentioned, an improved locking and releasing mechanism for the brake pedal which not only is easily operable and conveniently accessible to the operator, but may be applied to standard automobile equipment with a minimum of expense and effort.

Other objects of the invention will in part be pointed out in the following detailed description of certain illustrative but preferred embodiments of the invention and will in part be obvious in connection therewith.

For a more complete disclosure of the nature and objects of the invention, reference is had to the following detailed description and to the accompanying drawings, in which:

Fig. 1 is a fragmentary vertical section and elevational view through the driver's compartment of an automobile showing an application of one embodiment of the invention;

Fig. 2 is an enlarged sectional view similar to Fig. 1, but showing the brake pedal in locked condition;

Fig. 3 is a wiring diagram of the signalling system;

Fig. 4 is an enlarged sectional view similar to Fig. 2, but disclosing a modified form of the invention;

Fig. 5 is a fragmentary elevation, showing a modification of the locking lug arrangement on the brake pedal lever;

Fig. 6 is a fragmentary sectional and elevational view of a modified form of locking mechanism for the brake pedal lever, and Fig. 7 is a fragmentary side elevation of Fig. 6.

Referring to the drawings for a detailed description of the illustrative embodiments of the invention there shown, and first to the embodiment of Figs. 1, 2, and 3, the floor of the driver's compartment is shown at 10, this compartment being of any well known standard or conventional construction and arrangement. The service brake pedal lever 11 is pivotally mounted at 12 having connected thereto a brake rod 13 which may be connected in any well known manner to the brakes of the automobile. A tensioned spring 14 is connected to the pedal lever to move the latter into normal brake-releasing position and said lever has an extension 15 extending into the driver's compartment and having a pedal member or pad 16 in position for access by the operator's foot. The braking equipment referred to may be the usual standard equipment for service braking as at present installed in motor vehicles, and accordingly may vary in different installations.

In order to lock the brake pedal lever in brake-setting or applying position, an improved locking mechanism is provided. In this embodiment a locking lug 17 is mounted upon the pedal lever extension 15 and may be adjustably attached thereto so as to be adjusted into proper locking position. The lower end of this locking lug is shaped to provide a locking nose cooperable with a locking pawl or detent 18 which in this embodiment is in the form of a metallic plate of sufficient width to provide a convenient contact surface for the operator's foot, and may form a rest for the heel. The pawl or detent plate 18 is pivotally mounted at 19 to the compartment floor having a rearward extension 20 beyond the pivot 19 contacting with the compartment floor to limit upward movement of the forward or locking end of the plate. A compression spring 21 is preferably positioned beneath the detent plate forwardly of the pivot 19 so as to urge the forward end of the plate upwardly. This pawl or pawl plate cooperates with the locking lug 17 as shown in Fig. 2 for holding the pedal lever in depressed or brake-setting position.

The pawl plate 18 is conveniently positioned beneath and in juxtaposition to the brake pedal and is preferably bent or turned upwardly at its forward end so as to cooperate conveniently with the operator's foot, and to be conveniently accessible so as to be reached by a slight movement of the foot from pedal-engaging position.

In the embodiment of the invention shown in Figs. 1 and 2, it will be seen that the detent plate 18 does not contact directly with the locking lug 17 to hold the pedal depressed, but it cooperates therewith through an intermediate pivoted plate or auxiliary holding member 29. As clearly shown in Fig. 2, the auxiliary holding member 29 contacts directly with the lug 17 when the parts are relatively disposed to lock the pedal in brake setting position, but the holding effort required to maintain the pedal in this position is transmitted to and sustained by the detent plate 18 with which the auxiliary holding member is in contacting relation. The auxiliary holding member 29 also serves as a signal controlling plate, and its structure and function are more fully described below.

Positioned preferably beneath the compartment floor is a signal controlling switch. This switch may be of any well known construction and arrangement and as shown includes an insulating tube or support 22 mounted upon the floor in which is a spring-contact plate 23 extending between contacts 24 electrically connected to a conductor 25. A switch-operating plunger or block 26 is slidable within the housing 22 having an insulation surface to engage the contact plate 23, and being connected by a stem or rod 27, as at 28, to the auxiliary holding and signal operating plate 29 shown as being pivoted at 30 to the compartment floor. A compression spring 31 within the supporting tube 22 normally urges the plunger 26 into position to cause the contact plate 23 to bridge the contacts 24, thus closing the circuit at this point. The switch-operating plate or lever 29 is positioned directly beneath the pawl plate 18 so as to be engaged by the latter when the forward end thereof is moved downwardly. The forward end of the operating plate is also positioned for engagement with the locking nose of the locking lug 17 which may be appropriately shaped as shown for this engagement. Positioned between the compartment floor and the operating plate 29 is a second coiled spring 31' which normally positions the operating plate upwardly a short distance from the floor in position for engagement with the locking lug 17 and permits the lug in its downward movement to pass by the end of the operating plate. The two springs 31 and 31' are positioned and relatively stressed so as to maintain the parts normally in the position shown in Fig. 1 with the switch 23 in closed position.

Referring to Figs. 1 and 2, and the wiring diagram of Fig. 3, it will be noted that an additional switch 32 is connected in series with the circuit 25 and that this circuit is connected in a conventional manner to the signal light 33 and to the battery which is conventionally shown. This signal light may be positioned so as to be displayed to the rearward of the vehicle in the usual manner, and the switch 32 is connected by a link 34 with pedal lever 1! so as to be closed when the pedal is depressed into brake-setting position.

The operation of the improved brake-controlling mechanism will now be clearly understood from the above detailed description of one embodiment. Assuming that it is desired to set the brake to slow down or stop the vehicle, as for example when the traffic is stopped by a traffic signal light, or when it is desired to hold the brakes in set condition to park the car, or to hold it upon a hill, or in congested traffic, the brake pedal is depressed by the operator in the usual manner, thus applying the brakes and closing the switch 32 of the signal circuit. Since the spring-contact plate 23 is positioned at this time to close the circuit, the circuit is thus completed and the rear signal 33 displayed. Also, the locking lug 17 is moved downwardly past the end of the locking pawl plate 18, past the end of the operating plate 29 into the position shown in Fig. 2. This lug is so positioned and adjusted that it will engage underneath the ends of the pawl or detent plate 18 and of the auxiliary holding plate 29, thus locking the pedal in depressed position and holding the brakes in set condition. As the pressure upon the brake pedal under influence of the spring 14 is released, the pedal moves reversely or upwardly slightly, engaging the end of the plate 29 causing retraction of the plunger 26 and opening the signal circuit by action of the plunger block 26 which moves into engagement with the contact plate 23, moving it away from the contact 24 and extinguishing the signal light. The vehicle may then remain in this braked condition until it is desired again to start it, the rear signal remaining extinguished. Since the brake is thus held in its set or applied condition entirely by the holding mechanism described, the operator is wholly relieved of the necessity of holding the brakes in applied condition by continued expenditure of physical energy, thus avoiding fatigue and physical exhaustion. This advantage is of especial importance where frequent starting and stopping are required, as in congested traffic, where stops are required by traffic stop signals, where stops are required on hills, and under other similar conditions. When the operator is ready to start, the brake pedal may be very quickly and easily released from its locked position merely by pressure of the foot upon the pawl plate 18 forwardly of its pivot 19, thus causing the pedal to be slightly depressed and causing the forward or locking end of the detent plate 18 together with the free end of the auxiliary holding plate 29 to pass beneath the lug 17 whereupon the pedal moves to releasing condition by operation of the spring 14. The pawl plate 18 is held at its locking position against the tension of spring 14 by engagement of the rearward extension 20 with the compartment floor.

In the embodiment of Fig. 5, the pedal extension 15 is shown as being provided with a plurality of locking lugs 17a positioned in series, whereby they may cooperate with the locking pawl plate 18 in the manner above described. These lugs 17a may, as shown, be formed integrally with the pedal lever. With this arrangement the brakes may be firmly set and locked in such condition by cooperation of the appropriate lug 17a with the pawl plate. Compensation may thus be made for different adjustments of the brake connections so that the brakes may be locked in firmly set condition, irrespective of brake adjustments. With this embodiment it will be observed that the same locking lug that locks the brake pedal serves under all conditions to operate the signal-controlling switch 23, thus assuring that the signal will be properly operated under different conditions of brake adjustment. When the brake is released as described, the switch 23 is automatically closed to complete the circuit at this point, thus setting said circuit for the next successive operation of the switch 32 to display the signal light.

According to the embodiment of the invention shown in Fig. 4, the general arrangement is similar to that already described above, but the operating mechanism is different in some of the details. In this form, the signalling system may be the same as that above described, having two controlling switches and the signal light, as shown in Fig. 3, but the spring switch plate 23b is mounted in a somewhat different manner, and the control therefor embodies a different mechanism.

Mounted underneath the compartment floor 10 is a supporting member 35, provided with bearings for mounting a plunger 36, for longitudinally reciprocating movement. This plunger is urged into retracted or inoperative position by means of a compression spring 37, and mounted on the upper forward end thereof is the locking pawl or bolt 18b, positioned for cooperation with the locking lug 17b mounted upon the pedal lever 15b. The locking lug 17b and bolt 18b are provided with interengaging hook-like lugs or projections 38, adapted to contact and interlock with each other when in locking position, as shown in Fig. 4. At its lower or rearward end the plunger is provided with a cam or cam block 39, having an inclined cam surface positioned for engagement with the conical end of an operating rod 40, mounted in suitable bearings in the compartment floor, and having an operating head or enlargement 41 positioned beneath and in juxtaposition to the pedal, for convenient access by the operator's foot, in a manner similar to the mounting of the pawl plate 18.

The switch plate 23b may be mounted in any convenient manner, as by means of an insulating block 42, carrying the switch terminals 24b connected to the conductors 25 of the signal circuit. Mounted upon the plunger 36 is a switch operating member 43, which is of insulating material.

In the operation of the embodiment of Fig. 4, the operator depresses the pedal lever 15b to apply the brake, as in the embodiment of Figs. 1 and 2. When the pedal is fully depressed to set the brake and it is desired to lock the mechanism in this condition, the operator presses downwardly upon the operating rod 40, which engages the cam 39, to project the plunger 36 forwardly into locking position. Upon the slight retraction of the pedal lever the locking lug 17b engages the locking bolt 18b, thus holding the pedal from further retraction and maintaining the brakes in applied condition. The hook-like lugs 38 will now interengage and interlock with each other, thus holding the locking bolt from retraction under the influence of the spring 37. Therefore, the brake will remain in locked condition until it is again desired to release it, whereupon a slight depression of the pedal lever will cause the holding lugs 38 to be disengaged from each other, and will cause the detent 18b to be retracted to releasing position through action of the spring 37, whereupon the pedal lever and brake will be released.

When the locking bolt is projected forwardly into locking position, the switch operating member 43 moves to disengage the switch plate 23b, whereupon the switch opens, due to the bias of the spring plate 23b, thus opening the signalling circuit and extinguishing the signal lamp 33 as long as the brake remains in locked condition. When the brake lock is released, as described, movement of the locking bolt to the rearward causes the switch to be closed due to the engagement therewith of the operating member 43. This switch will then remain in closed position so that the signal light will be displayed by depression of the brake pedal to close the switch 32, as described in connection with Figs. 1 and 2.

Figs. 6 and 7 disclose a modified embodiment of the locking lug and locking pawl wherein the lug 17c is in the form of a bifurcated member secured in position upon the brake pedal 15c by means of a set-screw or similar securing means. The locking pawl or bolt 18c also has a bifurcated locking terminal, and both the lug and the pawl are provided on each fork with interengaging retaining lugs 38c, which function in a manner similar to the lugs 38 described. Although the locking lugs 17b and 17c are shown as being secured for adjustment upon the brake pedal lever, it may, in some cases, be desirable to construct these locking lugs integrally with the brake pedal lever and to provide a plurality of such lugs in series in a manner suggested in Fig. 5, and it is to be understood that these modifications are within the scope of the invention.

Since certain changes may be made in the above construction and different embodiments of the invention could be made without departing from the scope thereof, it is intended that all matter contained in the above description or shown in the accompanying drawings shall be interpreted as illustrative and not in a limiting sense.

Having described my invention, what I claim as new and desire to secure by Letters Patent is:

1. In a vehicle brake-controlling system, in combination, a brake pedal lever whereby the operator may set the brake, a locking device including a locking lug on said pedal lever, a detent plate movably mounted beneath said pedal lever so as to be readily accessible for operation by the operator's foot, means whereby said detent plate is caused to cooperate with said lug to lock said pedal lever in brake setting position, a signal circuit having two controlling switches, operating connections for closing the first of said switches upon depressing said pedal lever to set the brake, and operating connections controlled by the locking device for opening the other switch when said first switch is closed.

2. In a vehicle brake-controlling system, in combination, a brake lever whereby the operator may set the brake, a locking device for holding said lever in brake-setting position, including a locking lug on the lever, a signal lamp, means operatively connected to said brake lever for lighting said lamp by operation of said lever to set the brakes, means for extinguishing said lamp when said lever is in brake-setting condition, including an electric circuit and a switch therein, and means operated by said lever through said locking lug for operating said switch to extinguish said signal lamp when said lug moves into locking position.

3. In a vehicle brake-controlling system, in combination, a brake pedal lever whereby the operator may set the brake, a locking device for holding said pedal lever in brake-setting position, including a plurality of locking lugs arranged in series on the pedal lever, a movably mounted locking member positioned for engagement in pedal locking relation with one or another of said lugs dependent upon the extent of pedal depression to set the brake, a signal lamp, means operatively connected to said brake lever for lighting said signal lamp by operation of said lever to set the brake, means for extinguishing said signal lamp when said lever is in brake setting condition including an electric circuit and a switch therein, and means operated by said pedal lever through the same locking lug that locks the pedal lever in position so as to open said switch to extinguish said signal lamp when said lug moves into locking position.

4. In a vehicle brake controlling system, in combination, a brake lever whereby the operator may set the brake, a movably mounted locking member cooperable with said lever for holding it in brake setting position, said lever and locking member having interengaging lugs for holding the locking member in holding position, biasing means tending to move said locking member into releasing position, a signal, means operatively connected to said brake lever for effecting indicating operation of said signal by operation of said lever to set the brake, a signal circuit and a switch for opening and closing the circuit, means operatively connected to said locking member for opening said switch to discontinue operation of said signal when said locking member moves into locking position, and means under control of the operator for moving said locking member into locking position.

5. In a vehicle brake controlling system, in combination, a brake lever whereby the operator may set the brake, a movably mounted locking member cooperable with said lever for holding it in brake setting position, said lever and locking member having interengaging lugs for holding the locking member in holding position, a signal, means operatively connected to said brake lever for effecting indicating operation of said signal by operation of said lever to set the brake, a signal circuit and a switch for opening and closing the circuit, means operatively connected to said locking member for opening said switch to discontinue operation of said signal when said locking member moves into locking position, means under control of the operator for moving said locking member into locking position, and means for returning said locking member into its normal, non-locking position upon slight displacement of said lever from its locked position, and at the same time closing said switch.

6. In a vehicle brake control system, in combination, a brake lever whereby the operator may set the brake, a movably mounted locking member cooperable with said lever for holding it in brake setting position, means under control of the operator for moving said locking member into locking position, means normally urging said locking member into its releasing position, a signal, means controlled by brake setting operation of said brake lever for operating said signal, means controlled by operation of said locking member into lever locking position for discontinuing operation of said signal when said lever is in brake setting position, and releasable holding means for holding said locking member in lever holding position and being operatively connected to said lever so as to be released by operation thereof whereby the locking member is moved to releasing position by said urging means.

7. In a vehicle brake control system, in combination, a brake lever whereby the operator may set the brake, a movably mounted locking member cooperable with said lever for holding it in brake setting position, releasable holding means for holding said locking member in lever holding position, means under control of the operator for moving said locking member into locking position, means normally urging said locking member into its releasing position, a signal, means controlled by brake setting operation of said brake lever for operating said signal, and means controlled by operation of said locking member into lever locking position for discontinuing operation of said signal when said lever is in brake setting position, said holding means for the lever locking member being connected to said lever so as to be released by slight displacement of said lever from its locking position.

8. In a vehicle brake controlling system, in combination, a brake operating member whereby the operator may set the brake, a locking device for locking said operating member in brake setting position including a locking lug operatively connected to said operating member and a holding device with which said lug cooperatively engages to hold the brake operating member in brake setting condition, a signal, means operatively connected to said brake operating member and including a circuit for effecting indicating operation of said signal by operation of said brake operating member to set the brake, a switch in said circuit, yielding biasing means operatively connected to control said switch and normally tending to operate the latter into circuit closing position, and means connected to oppose said yielding biasing means and operatively cooperating with said locking lug and controlled thereby when in locking condition for maintaining said switch in open position in opposition to said biasing means so as to discontinue operation of said signal when said brake operating member is in brake setting condition.

9. In a vehicle brake controlling system, in combination, a brake operating member whereby the operator may set the brake, a locking device for locking said member in brake setting position, including a holding device cooperating with said brake setting member for holding the latter in brake setting position, a signal, means operatively connected to said brake operating member, for effecting indicating operation of said signal by operation of said brake operating member to set the brake, a signal control device operatively connected to said holding device for discontinuing signal operation, said control device including a biasing element normally biasing the control device into signal indicating condition, and means connected to oppose said biasing means and operatively cooperating with said brake operating member and controlled thereby when the latter is in locked, brake setting condition for maintaining said signal controlling device in signal-discontinuing condition in opposition to said biasing means so as to discontinue operation of said signal when said brake operating member is in brake setting condition.

HELEN A. RANLETT.